(12) United States Patent
Sakamaki

(10) Patent No.: US 10,783,333 B2
(45) Date of Patent: Sep. 22, 2020

(54) MAGNETIC JAMMER AND CARD READER

(71) Applicant: NIDEC SANKYO CORPORATION, Nagano (JP)

(72) Inventor: Hirotaka Sakamaki, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 0 days.

(21) Appl. No.: 16/363,236

(22) Filed: Mar. 25, 2019

(65) Prior Publication Data

US 2019/0303627 A1    Oct. 3, 2019

(30) Foreign Application Priority Data

Mar. 29, 2018  (JP) .................................. 2018-064174

(51) Int. Cl.
  *G06K 7/08*      (2006.01)
  *H04K 3/00*      (2006.01)
  *G06K 19/073*    (2006.01)

(52) U.S. Cl.
  CPC .............. *G06K 7/087* (2013.01); *H04K 3/62* (2013.01)

(58) Field of Classification Search
  CPC ........ G06K 7/087; G06K 7/08; G07F 7/0873; H04K 3/62; H04K 3/86; H04K 3/825
  See application file for complete search history.

(56) References Cited

U.S. PATENT DOCUMENTS

| 2013/0062410 A1* | 3/2013 | Mitchell | G06K 13/0868 235/449 |
| 2013/0299582 A1* | 11/2013 | Ozawa | G06K 7/0091 235/440 |
| 2016/0283754 A1* | 9/2016 | Hoson | G06K 7/0091 |

FOREIGN PATENT DOCUMENTS

WO    2015133567 A1    9/2015

* cited by examiner

*Primary Examiner* — Laura A Gudorf
(74) *Attorney, Agent, or Firm* — Cantor Colburn LLP

(57) ABSTRACT

A magnetic jammer for a card reader and structured to generate a magnetic field for jamming illegal reading of magnetic data stored on a card may include a core including magnetic material; a coil wound around the core and structured to generate a jamming magnetic field; a case accommodating the core and the coil; and a resin sealant filling the inside of the case and covering the core and the coil. The core and the coil may be disposed apart from an inner face of the case such that the core and the coil do not come into contact with the inner face of the case. A portion of the resin sealant may be disposed between the core and the inner face of the case and between the coil and the inner face of the case.

22 Claims, 7 Drawing Sheets

MAGNETIC JAMMER AND CARD READER

CROSS REFERENCE TO RELATED APPLICATION

The present application claims priority under 35 U.S.C. § 119 to Japanese Application No. 2018-064174 filed Mar. 29, 2018, the entire content of which is incorporated herein by reference.

BACKGROUND

Field of the Invention

At least an embodiment of the present invention relates to a magnetic jammer for a card reader. At least an embodiment of the present invention also relates to a card reader including the magnetic jammer.

Description of the Related Documents

Magnetic jammers have been used in card readers to prevent skimming, which is an act of illegally reading magnetic data stored on cards (for example, refer to WO 2015/133567). The magnetic jammer according to WO 2015/133567 generates a magnetic field to jam illegal reading of magnetic data stored on a card. The magnetic jammer is disposed inside a card receiver having a card slot. The magnetic jammer includes a core and coils wound around the core via bobbins for generation of a jamming magnetic field. An alternating current is fed to the coils.

The inventors have conducted a study on facilitation of the handling the magnetic jammer according to WO 2015/133567 before installation into the card receiver by storing the core and the coils in a case. However, it has become apparent through studies conducted by the inventors that when the core and the coils are stored in a case, a relatively large alternating current fed to the coils to generate a relatively intense jamming magnetic field at the magnetic jammer causes the core to vibrate, and the vibration of the core is transferred to the case thereby causing the magnetic jammer to generate relatively large noise. The user of the card reader inserts or removes a card to or from the card slot. If a relatively large noise is generated at the magnetic jammer disposed in the card receiver having the card slot, such noise will cause discomfort to the user of the card reader.

SUMMARY

At least an embodiment of the present invention provides a magnetic jammer that generates a magnetic field for jamming illegal reading of magnetic data stored on a card while suppressing noise generated at the magnetic jammer, even when a case is provided to accommodate a core and coils for generation of a jamming magnetic field. Additionally, at least an embodiment of the present invention provides a card reader including such a magnetic jammer.

To achieve the above, the magnetic jammer according to at least an embodiment of the present invention for a card reader and generating a magnetic field for jamming illegal reading of magnetic data stored on a card includes a core composed of magnetic material, coils wound around the core and generating jamming magnetic field, a case accommodating the core and the coils, and a resin sealant filling the inside of the case and covering the core and the coils, wherein the core and the coils are disposed apart from the inner faces of the case such that the core and the coils do not come into contact with the inner faces of the case, and a portion of the resin sealant is disposed between the inner faces of the case and the core and the coils.

In the magnetic jammer according to at least an embodiment of the present invention, the core and the coils in the case are disposed apart from the inner faces of the case such that the core and the coils do not come into contact with the inner faces of the case. Thus, in at least an embodiment of the present invention, transfer of the vibration of the core to the case can be suppressed, the vibration being generated in response to an alternating current fed to the coils. Thus, in at least an embodiment of the present invention, noise generated at the magnetic jammer can be suppressed even when a case is provided to accommodate the coils and the core.

In at least an embodiment of the present invention, a portion of the resin sealant is disposed between the inner faces of the case and the core and the coils. Thus, the portion of the resin sealant disposed between the inner faces of the case and the core and the coils can certainly maintain a non-contact state of the inner faces of the case and the core and the coils. In at least an embodiment of the present invention, the core and the coils are covered with the resin sealant filling the inside of the case. Thus, the resin sealant can achieve satisfactory water resistance of the core and the coils and satisfactory heat radiating properties of the coils.

The magnetic jammer according to at least an embodiment of the present invention may further include a circuit board electrically connected to the coils, at least a portion of the circuit board be disposed inside the case, and the coils be fixed to the circuit board. In such a configuration, an integration of the core, the coils, and the circuit board can be disposed inside the case. Thus, the core, the coil, and the circuit board can be readily handled when the core, the coil, and the circuit board are to be disposed inside the case.

In at least an embodiment of the present invention, the case may have circuit-board supports supporting the circuit board. In such a configuration, the circuit-board supports can be used to position the core, the coils, and the circuit board relative to the case such that the core and the coils do not come into contact with the inner faces of the case. Thus, a portion of the resin sealant can fill the gaps between the inner faces of the case and the core and the coils while readily maintaining a non-contact state of the inner faces of the case and the core and the coils. As a result, the gaps between the inner faces of the case and the core and the coils can be readily filled with a portion of the resin sealant.

The magnetic jammer according to at least an embodiment of the present invention may further include a circuit board electrically connected to the coils, at least a portion of the circuit board be disposed inside the case, and the circuit board cover the core and the coils from at least three directions. In such a configuration, the circuit board covering the core and the coils from at least three directions can certainly maintain a non-contact state of the inner faces of the case and the core and the coils. In such a configuration, the circuit board covering the core and the coils from at least three directions promotes prevention of destruction of the coils and other components by a person with bad intentions.

In at least an embodiment of the present invention, the circuit board may be a rigid-flexible substrate including two rigid substrates between which the core and the coils are disposed and a flexible printed substrate connecting the two rigid substrates, and the circuit board cover the core and the coils from three directions. Such a configuration facilitates the handling of the circuit board because the circuit board integrated into a single unit covers the core and the coils from three directions.

In at least an embodiment of the present invention, the core may include multiple core segments that are separate bodies, and the core segments be integrated into a single unit. According to studies conducted by the inventors, since such a configuration includes the core including multiple core segments that are separate bodies, the natural frequencies of the core segments can be increased such that these natural frequencies are out of the audible frequency range of human. Furthermore, according to the studies conducted by the inventors, since such a configuration includes a core that is an integrated unit of multiple core segment that have natural frequencies out of the audible frequency range of human, noise generated at the magnetic jammer can be suppressed even when the magnetic jammer includes compact coils.

The magnetic jammer according to at least an embodiment of the present invention may include core segments, i.e., a first core segment having a linear rod-like shape, a second core segment having a linear rod-like shape and being disposed parallel to the first core segment, a third core segment having a linear rod-like shape and being disposed parallel to the first core segment, a fourth core segment having a linear rod-like shape and being disposed parallel to the first core segment, and a connecting core segment fixed to one end portion of the first core segment, one end portion of the second core segment, one end portion of the third core segment, and one end portion of the fourth core segment, and coils be wound around the first core segment, the second core segment, the third core segment, and the fourth core segment. Such a configuration enables ready formation of the core segments because the first core segment, the second core segment, the third core segment, the fourth core segment, and the connecting core segment have liner rod-like shapes.

The magnetic jammer according to at least an embodiment of the present invention can be used in a card reader. The card reader can suppress noise generated at the magnetic jammer, even when a case is provided to accommodate the coils for generation of a jamming magnetic field and the core around which the coils are wound.

As described above, a magnetic jammer according to at least an embodiment of the present invention that generates a magnetic field for jamming illegal reading of magnetic data stored on a card can suppress noise generated at the magnetic jammer even when a case is provided to accommodate the coils for generating a jamming magnetic field and the core around which the coils are wound.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will now be described with reference to the accompanying drawings. (Overall Configuration of Card Reader)

Figure 1:
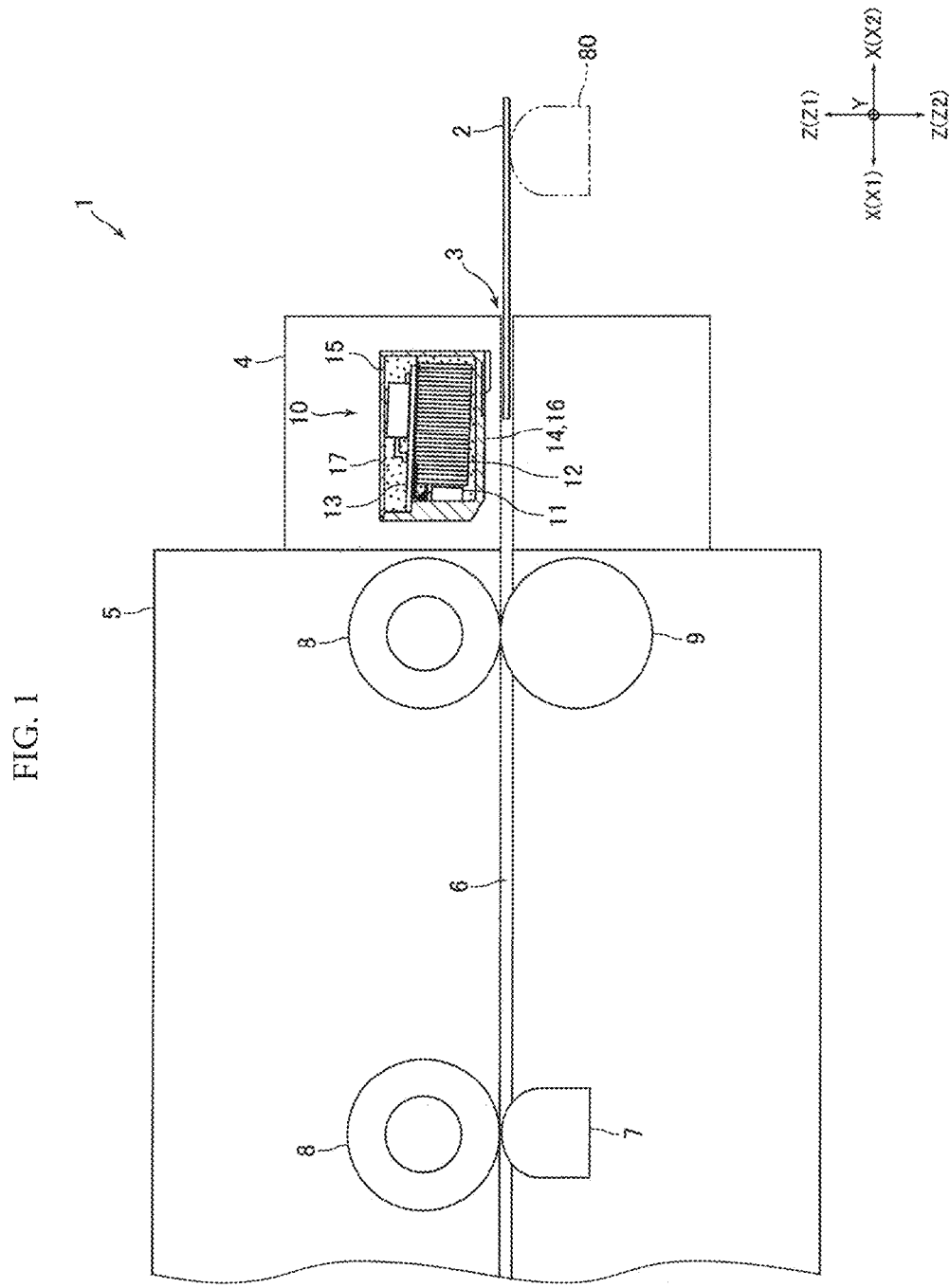
FIG. 1 is a schematic side view of the configuration of a front end portion of a card reader according to a first embodiment of the present invention.

FIG. 1 is a schematic side view of the configuration of a front end portion of a card reader 1 according to an embodiment of the present invention.

The card reader 1 according to this embodiment reads magnetic data stored on a card 2 or writes magnetic data on the card 2. The card reader 1 is installed in a predetermined higher-order apparatus, such as an automated teller machine (ATM). The card reader 1 includes a card receiver 4 having a card slot 3 to which the card 2 is inserted and a body 5. A card traveling path 6 is defined inside the card reader 1. The card 2 inserted to the card slot 3 travels through the card traveling path 6.

The card reader 1 further includes a magnetic head 7, drive rollers 8, and a pad roller 9. The magnetic head 7 carries out at least one of reading of magnetic data stored on the card 2 and writing of magnetic data on the card 2. The drive rollers 8 and the pad roller 9 transport the card 2. The card reader 1 further includes a magnetic jammer 10 that generates a magnetic field for jamming illegal reading of magnetic data stored on the card 2. In other words, the magnetic jammer 10 is used by the card reader 1.

In this embodiment, the card 2 travels through the card traveling path 6 in the X direction indicated in FIG. 1. The card 2 inserted to the card slot 3 travels in the X1 direction into the card reader 1, whereas the card 2 ejected from the card slot 3 travels in the X2 direction. The Z direction indicated in FIG. 1 and other drawings is orthogonal to the X direction and is parallel to the thickness direction of the card 2 residing in the card reader 1. The Y direction indicated in FIG. 1 and other drawings is orthogonal to the X and Z directions and parallel to the width direction of the card 2 residing in the card reader 1.

In the descriptions below, the X direction corresponds to the "front-rear direction," the Y direction corresponds to the "left-right direction," and the Z direction corresponds to the "top-bottom direction." One side in the front-rear direction or the X1 direction side in FIG. 1 and other drawings corresponds to the "rear" side, whereas the opposite side or the X2 direction side in FIG. 1 and other drawings corresponds to the "front" side. One side in the top-bottom direction or the Z1 direction side in FIG. 1 and other drawings corresponds to the "top" side, whereas the opposite side or the Z2 direction side in FIG. 1 and other drawings corresponds to the "bottom" side.

The card 2 is, for example, a substantially rectangular polyvinyl chloride card having a thickness of approximately 0.7 to 0.8 mm. The back face of the card 2 is provided with a magnetic strip that stores magnetic data. The magnetic strip is disposed along the longitudinal direction of the substantially rectangular card 2. The card 2 is inserted to the card reader 1 and transported through the card traveling path 6 while the back face of the card 2 faces downward and the longitudinal direction of the card 2 is substantially parallel to the front-rear direction. The card 2 may include a built-in IC chip. Alternatively, the card 2 may be a polyethylene terephthalate (PET) card having a thickness of approximately 0.18 to 0.36 mm or a paper card having a predetermined thickness.

The card receiver 4 is fixed to the front face of the body 5. The card receiver 4 has a hollow shape. The magnetic jammer 10 is disposed inside the hollow card receiver 4. The magnetic jammer 10 according to this embodiment is disposed above the card traveling path 6. Alternatively, the magnetic jammer 10 according to this embodiment may be disposed below the card traveling path 6. The detailed configuration of the magnetic jammer 10 will be described below.

The magnetic head 7, the drive rollers 8, and the pad roller 9 are disposed inside the body 5. The magnetic head 7 is disposed below and facing the card traveling path 6. The magnetic head 7 is disposed at a position in the left-right direction such that magnetic strip of the card 2 passes over the magnetic head 7. The drive rollers 8 are coupled with a motor via a power transmission mechanism, such as a belt or a pulley. One of the drive rollers 8 and the pad roller 9 face each other in the top-bottom direction. The pad roller 9 is urged toward the drive roller 8. The card 2 is transported between the drive roller 8 and the pad roller 9.

(Configuration of Magnetic Jammer)

Figure 2:
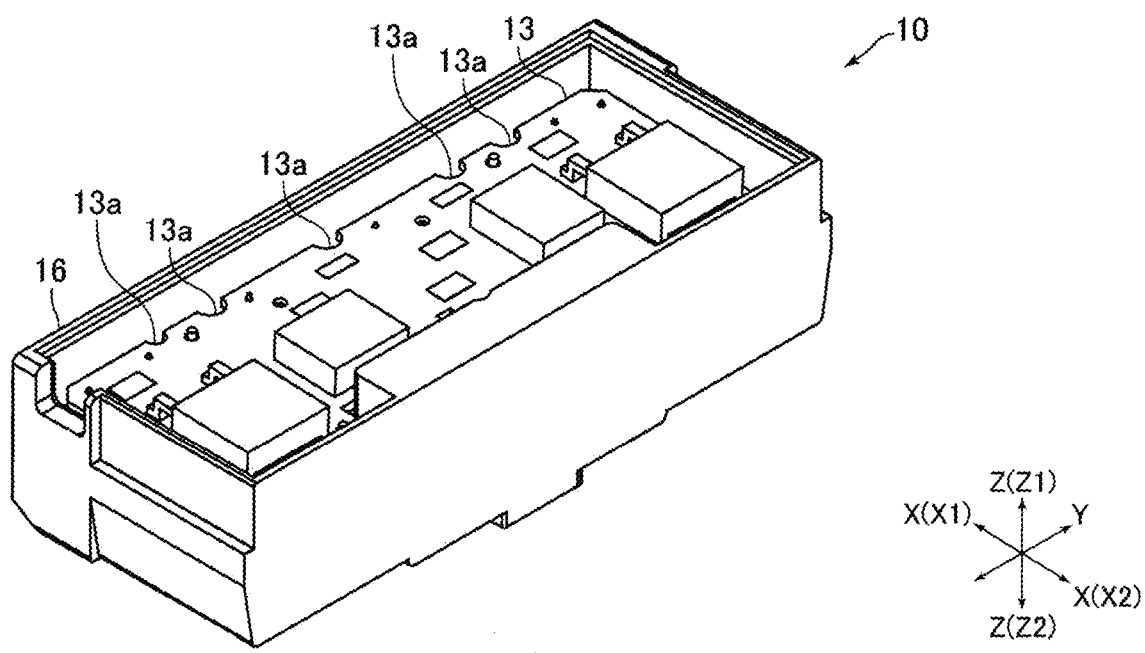
FIG. 2 is a perspective view of the magnetic jammer illustrated in FIG. 1.
Figure 3:
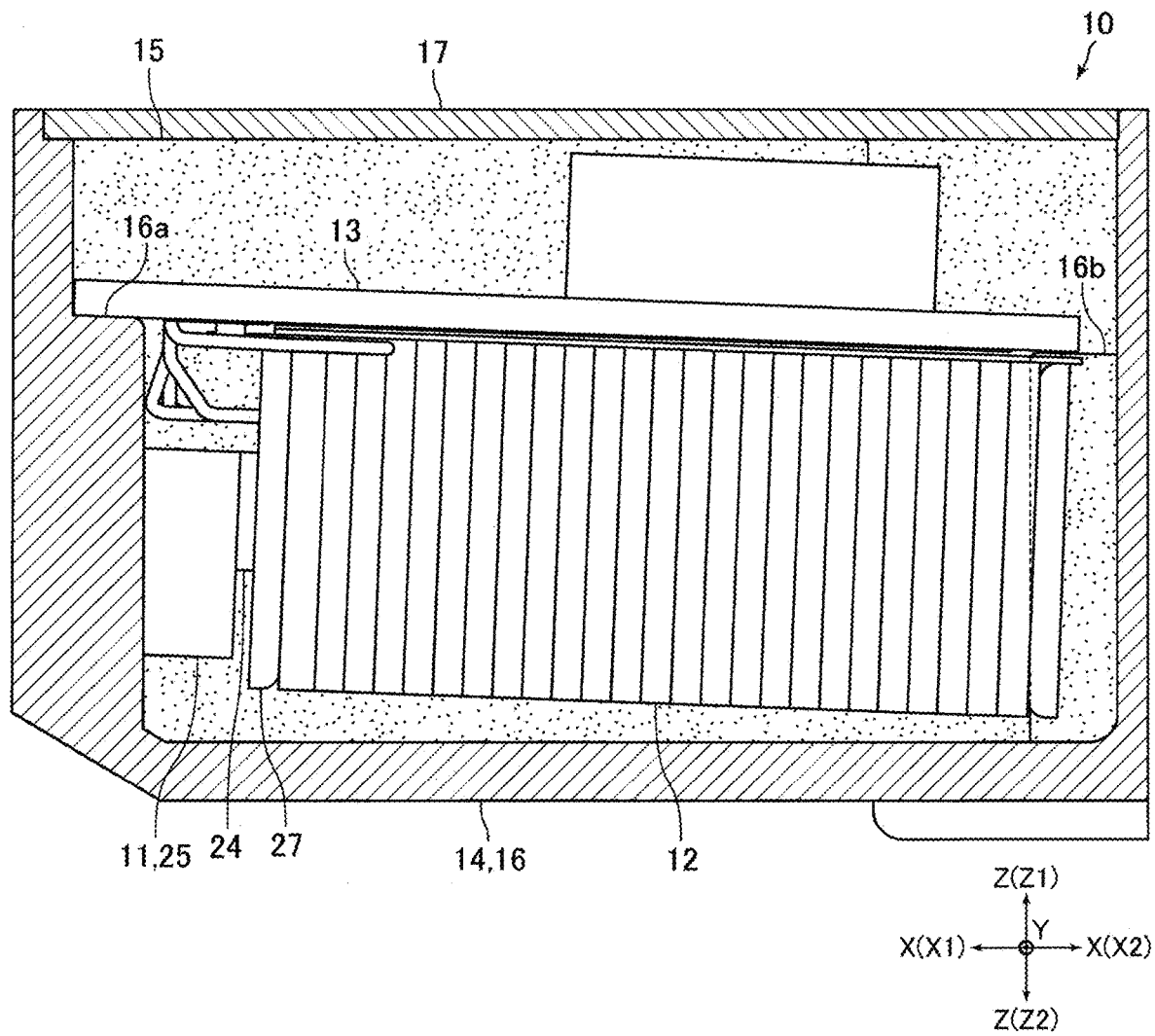
FIG. 3 is a cross-sectional view of the magnetic jammer illustrated in FIG. 2.
Figure 4:
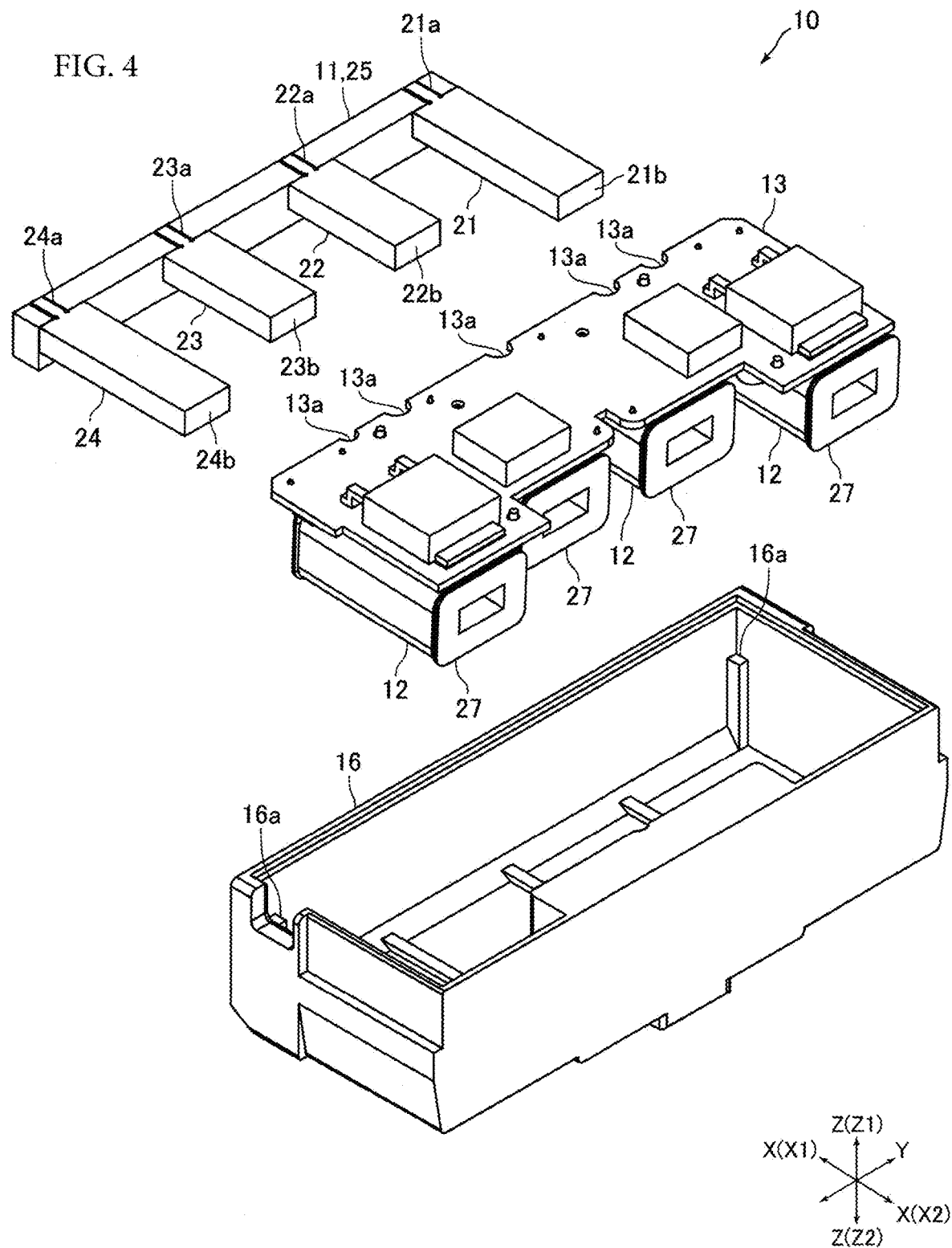
FIG. 4 is an exploded perspective view of the magnetic jammer illustrated in FIG. 2.
Figure 5:
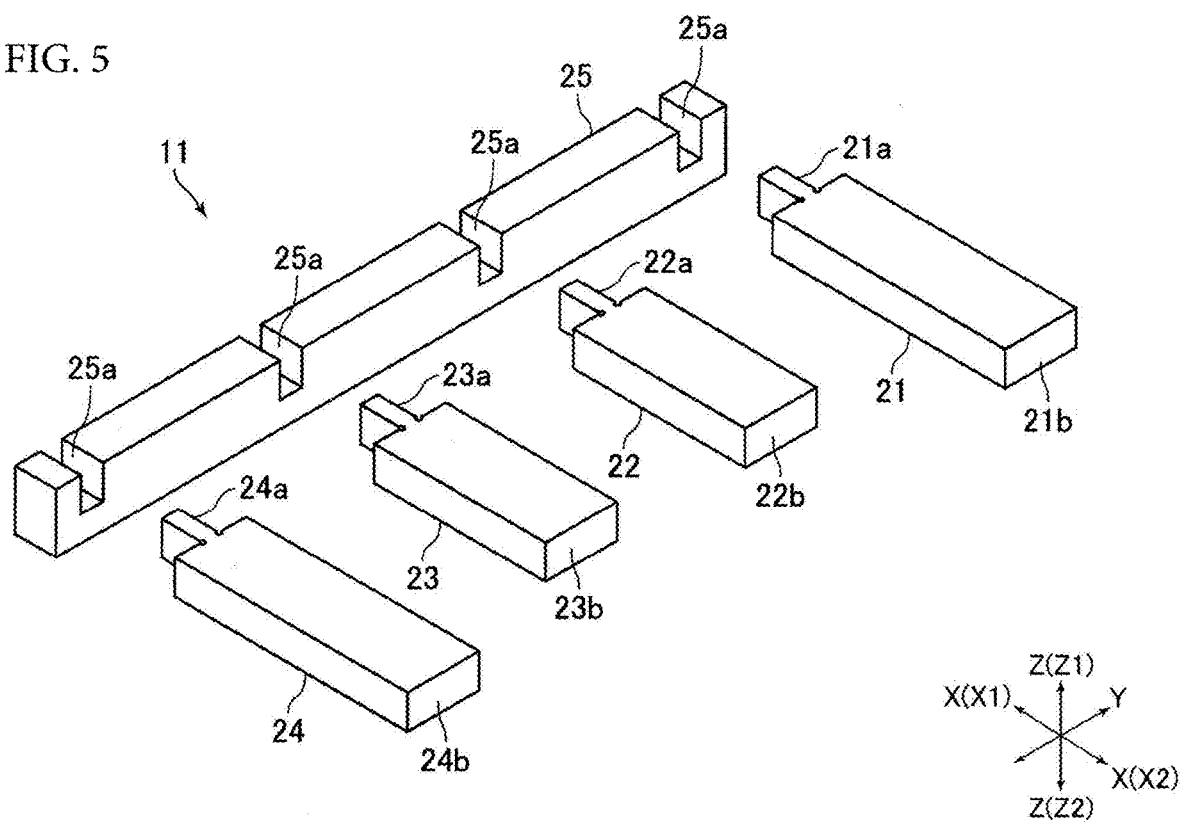
FIG. 5 is an exploded perspective view of the core illustrated in FIG. 4.

FIG. 2 is a perspective view of the magnetic jammer 10 illustrated in FIG. 1. FIG. 3 is a cross-sectional view of the magnetic jammer 10 illustrated in FIG. 2. FIG. 4 is an exploded perspective view of the magnetic jammer 10 illustrated in FIG. 2. FIG. 5 is an exploded perspective view of a core 11 illustrated in FIG. 4.

The magnetic jammer 10 includes a core 11 composed of magnetic material and magnetizing coils 12 wound around the core 11 and generating a jamming magnetic field. The magnetic jammer 10 further includes a circuit board 13 electrically connected to the coils 12, a case 14 accommodating the core 11, the coils 12 and the circuit board 13, and a resin sealant 15 filling the inside of the case 14. The case 14 includes a substantially cuboid case body 16 having an opening in the top face and a cover 17 covering the opening in the upper face of the case body 16. FIG. 2 and FIG. 4 do not illustrated the resin sealant 15 and the cover 17.

The core 11 is a laminated core consisting of a laminate of thin magnetic sheets. The core 11 includes a plurality of core segments 21 to 25 that are separate bodies. The core 11 according to this embodiment includes five core segments 21 to 25 that are separate bodies. The five core segments 21 to 25 are integrated into a single unit. In specific, the core 11 is formed by integrating the five core segments 21 to 25, which are separate bodies. As described above, the core 11 is a laminated core consisting of a laminate of thin magnetic sheets. Thus, the core segments 21 to 25 are also laminated cores each consisting of a laminate of thin magnetic sheets.

The core segments 21 to 25 each have a liner rod-like shape. In detail, the core segments 21 to 25 each have a thin quadrangular shape. The core segments 21 to 24 are disposed such that the longitudinal direction of the core segments 21 to 24 is parallel to the front-rear direction. The core segments 21 to 24 are disposed at predetermined intervals along the left-right direction. In other words, the core segments 22 to 24 are disposed parallel to the core segment 21. The core segments 21 to 24 are disposed in this order along the left-right direction.

The core segment 25 is disposed such that the longitudinal direction of the core segment 25 is parallel to the left-right direction. One of the ends of each of the core segments 21 to 24 is fixed to the core segment 25. In detail, the rear end portions 21a to 24a of the core segments 21 to 24, respectively, are fixed to the core segment 25. The core segment 21 according to this embodiment is a first core segment; the core segment 22 is a second core segment; the core segment 23 is a third core segment; the core segment 24 is a fourth core segment; and the core segment 25 is a connecting core segment.

The core segment 21 and the core segment 24 have identical shapes. The core segment 22 and the core segment 23 have identical shapes. The thickness of the core segments 21 and 24 in the top-bottom direction is the same as the thickness of the core segments 22 and 23 in the top-bottom direction. The width of the core segments 21 and 24 in the left-right direction is the same as the width of the core segments 22 and 23 in the left-right direction. The length of the core segments 21 and 24 is larger than the length of the core segments 22 and 23. The width in the left-right direction of the rear end portions 21a to 24a of the core segments 21 to 24, respectively, is smaller than the width in the left-right direction of the core segments 21 to 24 in portions other than the rear end portions 21a to 24a.

The thickness of the core segment 25 in the top-bottom direction is larger than the thickness of core segments 21 to 24 in the top-bottom direction. The core segment 25 has four recesses 25a that fit on the rear end portions 21a to 24a. The recesses 25a extend downward from the top face of the core segment 25. The core segments 21 to 24 are fixed to the core segment 25 while the rear end portions 21a to 24a fit to the recesses 25a. The core segments 21 to 24 are fixed to the core segment 25, for example, with an adhesive agent applied to the recesses 25a. In other words, the five core segments 21 to 25 are integrated into a single unit through fixture by an adhesive agent.

The coils 12 are wound around the core 11 via bobbins 27. In detail, the coils 12 are wound around the bobbins 27 of the core segments 21 to 24. That is, the magnetic jammer 10 includes four coils 12. The length of the core segments 21 and 24 is larger than the length of the core segments 22 and 23, as described above. Thus, the length of the coils 12 wound around the core segments 21 and 24 is larger than the length of the coils 12 wound around the core segments 22 and 23. The length of the bobbins 27 attached to the core segments 21 and 24 is larger than the length of the bobbins 27 attached to the core segments 22 and 23.

In this embodiment, the coil 12 wound around the core segment 21 and the coil 12 wound around the core segment 23 constitute a single conductive line, and the coil 12 wound around the core segment 22 and the coil 12 wound around the core segment 24 constitute a single conductive line. The ends of the conductive lines are electrically connected to the circuit board 13. The coil 12 of the core segment 21 is wound in a direction opposite to that of the coil 12 of the core segment 23. The coil 12 of the core segment 22 is wound in a direction opposite to that of the coil 12 of the core segment 24.

The coils 12 are connected to an AC power circuit supplying an alternating current to the coils 12. Feeding of an alternating current to the coils 12 generates a jamming magnetic field having field lines extending from one of the front end face 21b of the core segment 21 and the front end face 23b of the core segment 23 to the other one of the front end face 21b and the front end face 23b and a jamming magnetic field having field lines extending from one of the front end face 22b of the core segment 22 and the front end face 24b of the core segment 24 to the other one of the front end face 22b and the front end face 24b.

In detail, feeding an alternating current to the coils 12 generates a jamming magnetic field (AC magnetic field) periodically changing such that the direction of field lines alternate between a direction from the front end face 21b to the front end face 23b and a direction from the front end face 23b to the front end face 21b and a jamming magnetic field (AC magnetic field) periodically changing such that the direction of the field lines alternate between a direction from the front end face 22b to the front end face 24b and a direction from the front end face 24b to the front end face 22b.

The coils 12 may be connected to a drive circuit including a DC power source to be connected to the coils 12 and a capacitor to be connected to the DC power source in parallel with the coils 12. In such a case, the capacitor of the drive circuit and the coils 12 constitute a resonant circuit. Alternatively, the coils 12 may be connected to the DC power source via a circuit, such as an inverter, converting the DC to an AC. Whether the coils 12 are connected to either the AC power source or the DC power source, the direction of the magnetic field lines may be changed at any timing besides a periodic timing.

The circuit board 13 is a rigid substrate composed of, for example, glass epoxy. The circuit board 13 is disposed such that the thickness direction of the circuit board 13 is substantially parallel to the top-bottom direction. Four coils 12 are fixed to the circuit board 13. In detail, four coils 12 are fixed to the bottom face of the circuit board 13 with an adhesive agent. The core 11, the coils 12, and the bobbins 27 are disposed below the circuit board 13. The core 11 and the bobbins 27 are attached to the circuit board 13 by the coils 12. Various electronic parts are mounted on the top face of the circuit board 13.

It is presumed that a magnetic head 80 for skimming (hereinafter referred to as "skimming magnetic head 80") for illegally reading magnetic data stored on the card 2 is disposed in front of the card slot 3 and below the card traveling path 6, as illustrated in FIG. 1. Thus, the core segments 21 to 24 tilt such that the front ends are disposed slightly downward, to effectively influence the skimming magnetic head 80 with the jamming magnetic field generated by the magnetic jammer 10. The tilt of the core segments 21 to 24 causes the front edge of the circuit board 13 to be disposed slightly lower than the rear edge of the circuit board 13, i.e., the circuit board 13 slightly tilts in the front-rear direction.

The case body 16 has circuit-board supports 16a and 16b that support the circuit board 13 (see FIG. 3). The upper end faces of the circuit-board supports 16a and 16b are flat faces that come into contact with the bottom face of the circuit board 13 and support the circuit board 13 from below. The circuit-board supports 16a are disposed at the inner rear end of the case body 16, and the circuit-board supports 16b are disposed at the inner front end of the case body 16. In specific, the circuit-board supports 16a support the rear edge portion of the circuit board 13 from below, and the circuit-board supports 16b support the front edge portion of the circuit board 13 from below.

Two circuit-board supports 16a are provided at the left and right ends inside the case body 16 (see FIG. 4). Two circuit-board supports 16b are provided at the left and right ends inside the case body 16. The two circuit-board supports 16b are disposed more inward in the left-right direction than the two circuit-board supports 16a. The rear edge portion of the circuit board 13 is supported by the two circuit-board support 16a, and the front edge portion of the circuit board 13 is supported by the two circuit-board support 16b.

The front and rear end faces of the circuit board 13 are slightly in contact with the inner faces of the case body 16 or disposed slightly apart from the inner faces of the case body 16. Similarly, the left and right end faces of the circuit board 13 are disposed slightly in contact with the inner faces of the case body 16 or slightly apart from the inner faces of the case body 16.

The cover 17 has a rectangular planner shape. The cover 17 is disposed such that the thickness direction of the cover 17 is parallel to the top-bottom direction. As described above, the cover 17 covers the opening in the top face of the case body 16.

As described above, the core 11, the coils 12, and the circuit board 13 are disposed inside the case 14. More specifically, the core 11, the coils 12, the circuit board 13, and the bobbins 27 are disposed inside the case 14. The inside of the case 14 is filled with the resin sealant 15, as described above. In other words, the core 11, the coils 12, the circuit board 13, and the bobbins 27 are covered with the resin sealant 15. The resin sealant 15 is composed of potting resin, such as urethane resin. The hardness of the resin sealant 15 is relatively low, for example, approximately 42 degrees. In this embodiment, the resin sealant 15 establishes satisfactory water-resistance of the core 11, the coils 12, and the circuit board 13 and satisfactory heat radiating properties of the electronic parts mounted on the circuit board 13 and the coils 12.

The core 11, the coils 12, and the bobbins 27 are disposed apart from the inner faces of the case body 16 such that the core 11, the coils 12, and the bobbins 27 do not come into contact with the inner faces of the case body 16. In other words, the core 11, the coils 12, and the bobbins 27 are disposed apart from the inner faces of the case 14 such that the core 11, the coils 12, and the bobbins 27 do not come into contact with the inner faces of the case 14. A portion of the resin sealant 15 is disposed between the inner faces of the case body 16 and the core 11, the coils 12, and the bobbins 27. In other words, a portion of the resin sealant 15 is disposed between the inner faces of the case 14 and the core 11, the coils 12, and the bobbins 27. The core 11, the coils 12, and the bobbins 27 are disposed below the circuit board 13 and apart from the bottom face of the cover 17, as described above. In other words, the core 11, the coils 12, and the bobbins 27 are not in contact with the bottom face of the cover 17.

In this embodiment, the bottom face of the circuit board 13 to which the core 11, the coils 12, and the bobbins 27 are fixed is disposed in contact with the upper end faces of circuit-board supports 16a and 16b. In this state, the resin sealant 15 fills the inside of the case body 16 and covers the core 11, the coils 12, the circuit board 13, and the bobbins 27. The cover 17 is then fixed to the upper end portion of the case body 16. The rear edge of the circuit board 13 has a plurality of semi-circular notches 13a that receive dispenser for filling the space below the circuit board 13 with the resin sealant 15.

The magnetic jammer 10 of the card reader 1 generates a jamming magnetic field while the card 2 is inserted to the card reader 1 through the card slot 3 until, for example, the card 2 inserted to the card slot 3 is entirely taken into the card receiver 4. The magnetic jammer 10 of the card reader 1 also generates a jamming magnetic field while the card 2 is ejected from the card slot 3 until, for example, the ejected card 2 is ejected to a position at which the card 2 can be received by the user and actually pulled out by the user. In other words, the magnetic jammer 10 generates no jamming magnetic field during reading or writing of magnetic data by the magnetic head 7.

Main Advantageous Effects of this Embodiment

In this embodiment as described above, the core 11, the coils 12, and the bobbins 27 disposed inside the case 14 are disposed apart from the inner faces of the case 14 such that the core 11, the coils 12, and the bobbins 27 do not come into contact with the inner faces of the case 14. Thus, in at least an embodiment of the present invention, transfer of the vibration of the core 11 to the case 14 can be suppressed, the vibration being generated in response to an alternating current fed to the coils 12. Thus, in this embodiment, nose generated at the magnetic jammer 10 can be suppressed even when the case 14 is provided to accommodate the core 11, the coils 12, and the bobbins 27.

The core 11 according to this embodiment includes five core segments 21 to 25 that are separate bodies. Thus, according to the studies conducted by the inventors, the natural frequencies of the core segments 21 to 25 can be increased such that these natural frequencies are out of the audible frequency range of human. In this embodiment, the core 11 is an integrated unit of the five core segments 21 to 25, which have natural frequencies out of the audible frequency range of human. Thus, according to the studies conducted by the inventors, noise generated at the magnetic jammer 10 can be suppressed even when the magnetic jammer 10 includes compact coils 12.

In this embodiment, a portion of the resin sealant 15 is disposed between the inner faces of the case 14 and the core 11, the coils 12, and the bobbins 27. Thus, in this embodiment, the portion of the resin sealant 15 can certainly maintain a non-contact state of the inner faces of the case 14 and the core 11, the coils 12, and the bobbins 27. In this embodiment, the hardness of the resin sealant 15 is relatively low. Thus, transfer of the vibration of the core 11 to the case 14 can be suppressed even when a portion of the resin sealant 15 is disposed between the inner faces of the case 14 and the core 11, the coils 12, and the bobbins 27.

In this embodiment, the coils 12 are fixed to the circuit board 13. In this embodiment, the core 11 and the bobbins 27 are fixed to the circuit board 13 via the coils 12, and the core 11, the coils 12, the circuit board 13, and the bobbins 27 are integrated into a single unit before they are disposed inside the case body 16. Thus, in this embodiment, handling of the core 11, the coils 12, the circuit board 13, and the bobbins 27 is facilitated when the core 11, the coils 12, the circuit board 13, and the bobbins 27 are to be disposed inside the case body 16.

In this embodiment, the circuit-board supports 16a and 16b for supporting the circuit board 13 including the core 11, the coils 12, and the bobbins 27 are formed on the case body 16. Thus, in this embodiment, the circuit-board supports 16a and 16b can be used to position the core 11, the coils 12, the circuit board 13, and the bobbins 27 relative to the case 14 such that the core 11, the coils 12, and the bobbins 27 do not come into contact with the inner faces of the case 14. Thus, in this embodiment, a portion of the resin sealant 15 can fill the gaps between the inner faces of the case 14 and the core 11, the coils 12, and the bobbins 27 while readily maintaining a non-contact state of the inner faces of the case 14 and the core 11, the coils 12, and the bobbins 27. As a result, in this embodiment, the gaps between the inner faces of the case 14 and the core 11, the coils 12, and the bobbins 27 can be readily filled with a portion of the resin sealant 15.

In this embodiment, the five core segments 21 to 25 of the core 11 have linear rod-like shapes. Thus, in this embodiment, the core segments 21 to 25 can be readily produced.

(Modification of Core)

In the embodiment described above, the core segments 21 to 24 may be fixed to the core segment 25 by press-fitting the rear end portions 21a to 24a to the recesses 25a. In the embodiment described above, the core 11 includes the four core segments 21 to 24 around which the coils 12 are wound. Alternatively, the core 11 may include two or three core segments around which the coils 12 are wound or five or more core segments around which the coils 12 are wound.

Figure 6A:
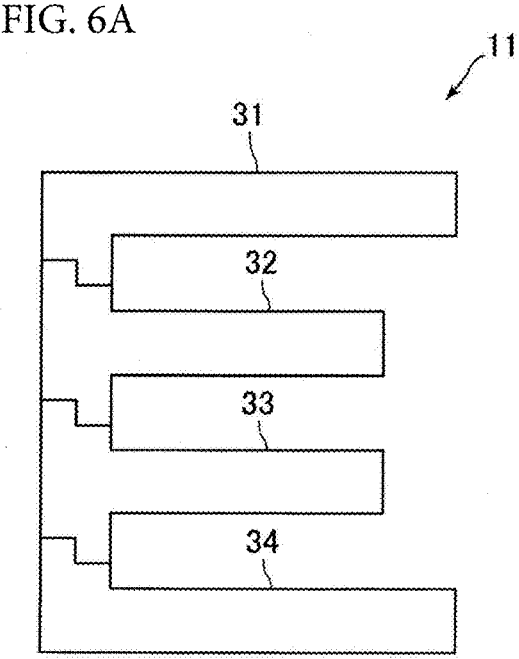
FIG. 6A and FIG. 6B illustrate the configurations of cores according to other embodiments of the present invention.
Figure 6B:
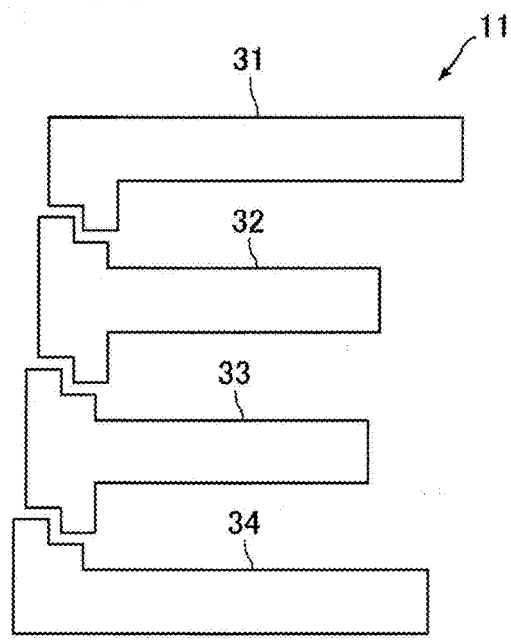

In the embodiment described above, the core 11 may alternatively include four or less core segments or six or more core segments. For example, the core 11 may include four core segments 31 to 34, as illustrated in FIG. 6A and FIG. 6B.

In such a case, for example, the core segment 25 according to the embodiments described above is divided into quarters, and the quarters of the core segment 25 are integrated with the core segments 21 to 24 to constitute core segments 31 to 34, respectively. The four core segments 31 to 35 are integrated into a single unit through fixture by an adhesive agent.

In the embodiment described above, the core 11 includes five core segments 21 to 25, which are separate bodies. Alternatively, the core 11 may be a single unit. The core 11 according to this embodiment is separated into five core segments 21 to 25. Alternatively, the core 11 may not be separated into core segments.

(Modification of Circuit Board)

Figure 7:
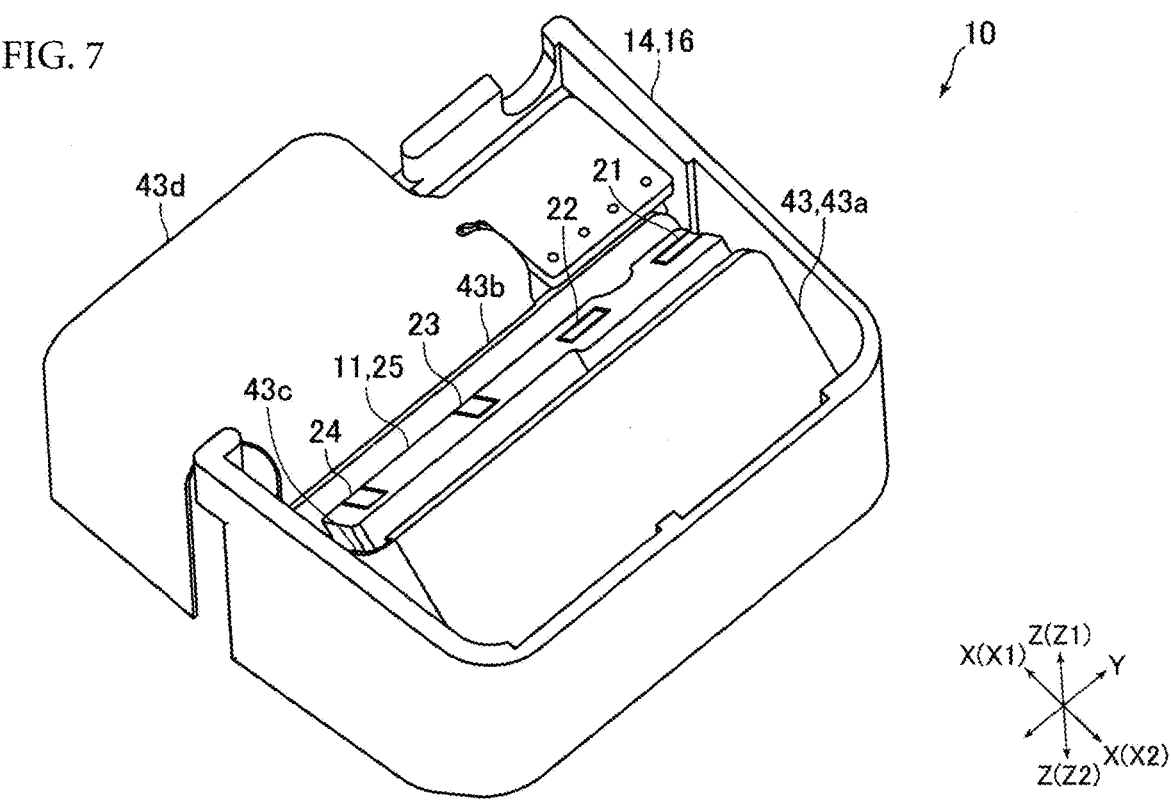
FIG. 7 is a perspective view of a magnetic jammer according to another embodiment of the present invention.
Figure 8:
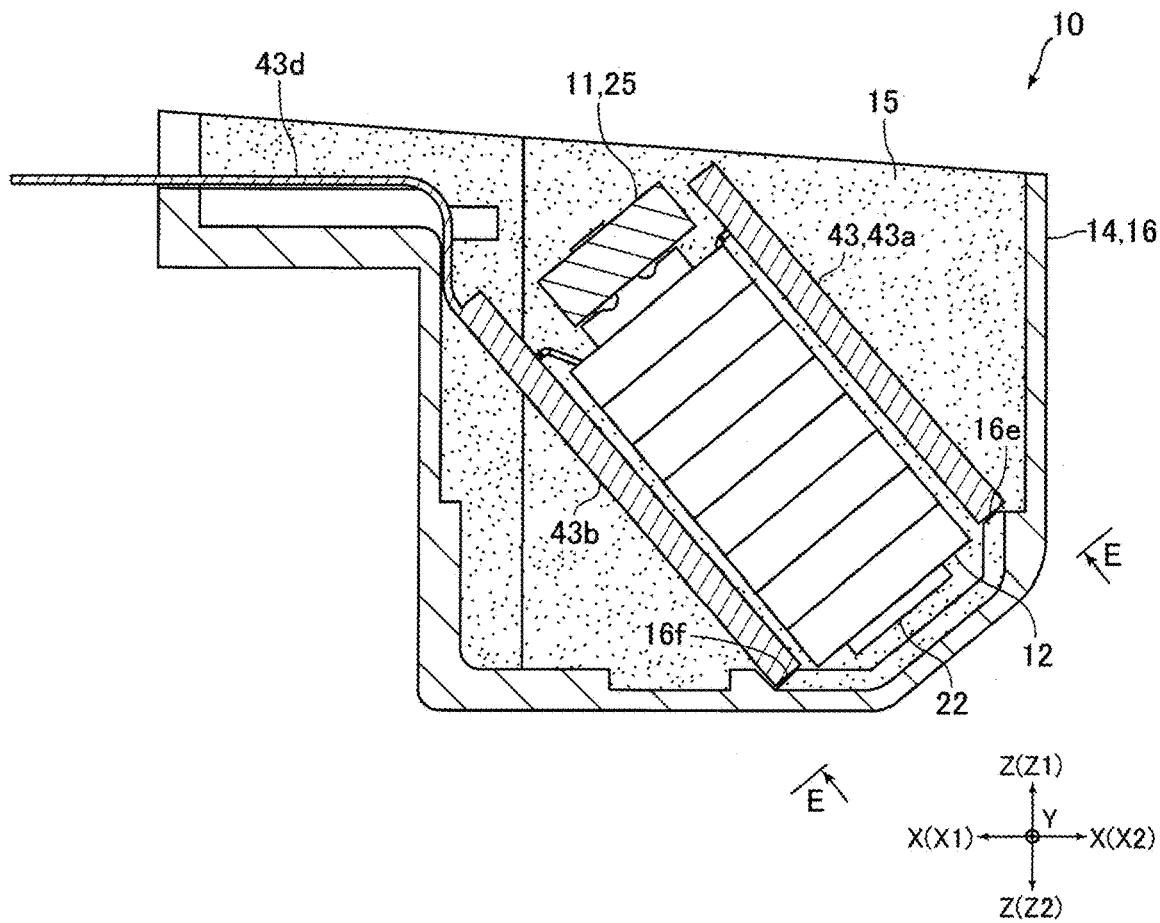
FIG. 8 is a cross-sectional view of the magnetic jammer illustrated in FIG. 7.
Figure 9:
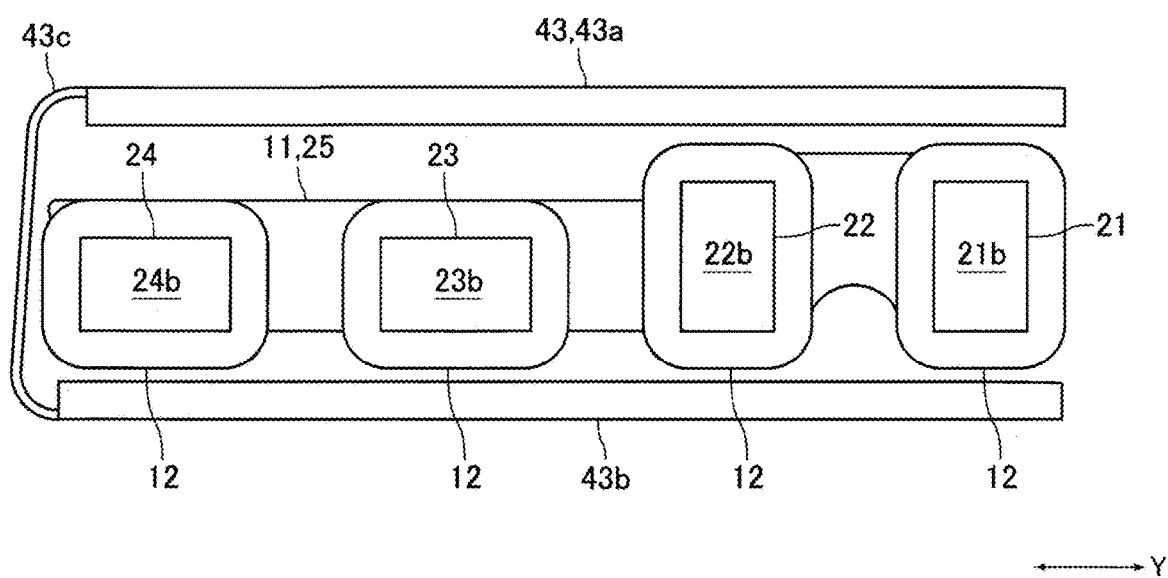
FIG. 9 illustrates the core, the coils, and the circuit board along line E-E in FIG. 8.

FIG. 7 is a perspective view of a magnetic jammer 10 according to another embodiment of the present invention. FIG. 8 is a cross-sectional view of the magnetic jammer 10 illustrated in FIG. 7. FIG. 9 illustrates the core 11, the coils 12, and a circuit board 43 along line E-E in FIG. 8.

In the embodiments described above, the magnetic jammer 10 may include a rigid-flexible substrate or a circuit board 43 in place of the circuit board 13, which is a rigid substrate. Four coils 12 are electrically connected to the circuit board 43. The configuration of the circuit board 43 and the configuration of the magnetic jammer 10 including the circuit board 43 will now be described. In FIG. 7 to FIG. 9, the components that are the same as those illustrated in FIG. 1 to FIG. 5 are indicated by the same reference signs. In FIG. 7 to FIG. 9, the bobbins 27 are not illustrated. In FIG. 7, the resin sealant 15 is not illustrated.

In the modification illustrated in FIG. 7 to FIG. 9, the core segments 21 to 24 tilt such that the front ends are disposed downward. In this modification, the tilt angle of the core segments 21 to 24 is larger than the tilt angle of the core segment 21 to 24 illustrated in FIG. 1 to FIG. 5. In this modification, the core segments 21 and 22 are disposed such that the transverse direction of the cross-sections of the core segments 21 and 22 is parallel to the left-right direction, and the core segments 23 and 24 are disposed such that the longitudinal direction of the cross-sections of the core segments 23 and 24 is parallel to the left-right direction, among the four core segments 21 to 24 having rectangular cross-sections as illustrated in FIG. 9. In this modification, the lengths of the core segments 21 to 24 are the same.

The circuit board 43 includes two rigid substrates 43a and 43b and a flexible printed substrate 43c connecting the rigid substrates 43a and 43b. The circuit board 43 includes a flexible printed substrate 43d led out from the rigid substrate 43b. The rigid substrate 43a diagonally covers the core 11 and the four coils 12 from the front upper side. The rigid substrate 43b diagonally covers the core 11 and the four coils 12 from rear lower side. In other words, the core 11 and the coils 12 are disposed between the rigid substrate 43a and 43b.

The flexible printed substrate 43c connects one edge of the rigid substrate 43a in the left-right direction and one edge of the rigid substrate 43b in the left-right direction. The flexible printed substrate 43c bends by 180 degrees and covers the core 11 and the four coils 12 from one side in the left-right direction. In other words, the circuit board 43 covers the core 11 and the coils 12 from three directions, or the core 11 and the coils 12 are covered with the circuit board 43 from three directions. In detail, the circuit board 43 covers the core 11, the coils 12, and the bobbins 27 from three directions, or the core 11, the coils 12, and the bobbins 27 are covered with the circuit board 43 from three directions.

The flexible printed substrate 43d is led out rearward from the upper rear edge of the rigid substrate 43b. The rigid substrates 43a and 43b and the flexible printed substrate 43c are disposed inside the case 14 (the case body 16). A portion of the flexible printed substrate 43d is disposed inside the case 14, and the other portions of the flexible printed substrate 43d are not disposed inside the case 14. In other words, a portion of the circuit board 43 is disposed inside the case 14.

Four coils 12 are fixed to the circuit board 13. For example, the two coils 12 wound around the core segments 21 and 22 are fixed to the rigid substrate 43a with an adhesive agent, and the two coils 12 wound around the core segments 23 and 24 are fixed to the rigid substrate 43b with an adhesive agent.

The case body 16 has circuit-board supports 16e and 16f that support the circuit board 43. In other words, the case 14 has the circuit-board supports 16e and 16f that support the circuit board 43. The circuit-board support 16e comes into contact with the bottom edge face of the rigid substrate 43a to diagonally support the rigid substrate 43a from the front lower side. The circuit-board support 16f comes into contact with the bottom edge face of the rigid substrate 43b to diagonally support the rigid substrate 43b from the front lower side.

The lower edge of the flexible printed substrate 43d connected to the rear upper edge of the rigid substrate 43b is disposed in contact with the rear inner face of the case body 16. The case body 16 supports the lower edge portion of the flexible printed substrate 43d. The flexible printed substrate 43c is slightly in contact with one of the inner faces of the case body 16 in the left-right direction or a small gap is formed between the flexible printed substrate 43c and one of the inner faces of the case body 16 in the left-right direction.

In the modification illustrated in FIG. 7 to FIG. 9, the resin sealant 15 fills the inside of the case 14, as in the embodiment described above. In other words, the core 11, the coils 12, the bobbins 27, the rigid substrates 43a and 43b, the flexible printed substrate 43c, and a portion of the flexible printed substrate 43d are covered with the resin sealant 15. As in the embodiment described above, the core 11, the coils 12, and the bobbins 27 are disposed apart from the inner faces of the case 14 such that the core 11, the coils 12, and the bobbins 27 do not come into to contact with the inner faces of the case 14, and a portion of the resin sealant be disposed between the inner faces of the case 14 and the core 11, the coils 12, and the bobbins 27.

In this modification, the bottom edge face of the rigid substrate 43a of the bottom the circuit board 43 covering the core 11, the coils 12, and the bobbins 27 from three directions is disposed in contact with the circuit-board support 16e, and the bottom edge face of the rigid substrate 43b is disposed in contact with the circuit-board support 16f. In this state, the resin sealant 15 fills the inside of the case 14 and covers the core 11, the coils 12, the bobbins 27, the rigid substrates 43a and 43b, the flexible printed substrate 43c, and a portion of the flexible printed substrate 43d.

In the modification illustrated in FIG. 7 to FIG. 9, the circuit board 43 covering the core 11, the coils 12, and the bobbins 27 from three directions can certainly maintains a non-contact state of the inner faces of the case 14 and the core 11, the coils 12, and the bobbins 27. In this modification, the circuit board 43 covering the core 11, the coils 12, and the bobbins 27 from three directions promotes prevention of destruction of the coils 12 and other components by a person with bad intentions. In this modification, handling of the circuit board 43 is facilitated because the rigid substrates 43a and 43b and the flexible printed substrates 43c and 43d are integrated into a single unit.

Alternatively, the core 11, the coils 12, and the bobbins 27 may be covered with the circuit board 43 from four, five, or six directions. Alternatively, the core 11, the coils 12, and the bobbins 27 may be covered with a plurality of rigid substrates that are separate bodies from three, four, five, or six directions. Alternatively, the entire circuit board 43 may be disposed inside the case 14.

Other Embodiments

Although at least an embodiment of the present invention has been described based on specific embodiments, the present invention is not limited to above embodiment and various modifications of the embodiments may be made without departing from the scope of the present invention.

In the embodiment described above, the case body 16 may not be provided with the circuit-board supports 16a and 16b. In such a case, the core 11, the coils 12, and the bobbins 27 are prevented from coming into contact with the inner faces of the case 14 by, for example, disposing and curing a portion of the resin sealant 15 on the inner bottom face of the case body 16, disposing the circuit board 13 provided with the core 11, the coils 12, and the bobbins 27 inside the case body 16, and filling the inside of the case 14 with the remaining portion of the resin sealant 15.

In the embodiment described above, the coils 12 may not be fixed to the circuit board 13. In such a case also, the core 11, the coils 12, and the bobbins 27 are prevented from coming into contact with the inner faces of the case 14 by, for example, disposing and curing a portion of the resin seal 15 on the inner bottom face of the case body 16, disposing the core 11, the coils 12, and the bobbins 27 inside the case body 16 and then the circuit board 13, and filling the inside of the case 14 with the remaining portion of the resin seal 15.

In the modification illustrated in FIG. 7 to FIG. 9, the case body 16 may not be provided with the circuit-board supports 16e and 16f. In the modification illustrated in FIG. 7 to FIG. 9, the coils 12 may not be fixed to the circuit board 43.

In the embodiments described above, the coils 12 may be directly wound around the core 11 when the core 11 and the coils 12 can be certainly insulated from each other. In the embodiments described above, the magnetic strip may be disposed on the front face of the card 2 or on both the front and back faces of the card 2. In the embodiment described above, the card reader 1 may be a manual card reader that reads or writes magnetic data while the user manually moves the card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A magnetic jammer for a card reader and structured to generate a magnetic field for jamming illegal reading of magnetic data stored on a card, the magnetic jammer comprising:
    a core comprising magnetic material;
        a coil wound around the core and structured to generate a jamming magnetic field;
        a case accommodating the core and the coil; and
        a resin sealant filling the inside of the case and covering the core and the coil, wherein,
    the core and the coil are disposed apart from an inner face of the case such that the core and the coil do not come into contact with the inner face of the case, and
    a portion of the resin sealant is disposed between the core and the inner face of the case and between the coil and the inner face of the case.

2. The magnetic jammer according to claim 1, further comprising:
    a circuit board electrically connected to the coil, at least a portion of the circuit board being disposed inside the case,
    wherein the coil is fixed to the circuit board.

3. The magnetic jammer according to claim 2, wherein the case comprises a circuit-board support supporting the circuit board.

4. The magnetic jammer according to claim 3, further comprising:
    a circuit board electrically connected to the coil, at least a portion of the circuit board being disposed inside the case,
    wherein the circuit board covers the core and the coil from at least three directions.

5. The magnetic jammer according to claim 4, wherein the circuit board comprises a rigid-flexible substrate comprising two rigid substrates between which the core and the coils are disposed and a flexible printed substrate connecting the two rigid substrates, and the circuit board covers the core and the coil from the three directions.

6. The magnetic jammer according to claim 4, wherein, the core comprises a plurality of separable core segments that comprise separate bodies integrated into a single unit.

7. The magnetic jammer according to claim 6, wherein, the core segments comprise:
    a first core segment having a linear rod shape;
    a second core segment having a linear rod shape and disposed parallel to the first core segment;
    a third core segment having a linear rod shape and disposed parallel to the first core segment;
    a fourth core segment having a linear rod shape and disposed parallel to the first core segment; and
    a connecting core segment having a linear rod shape and being fixed to an end portion of the first core segment, an end portion of the second core segment, an end portion of the third core segment, and an end portion of the fourth core segment, and
    the coil is wound around the first core segment, the second core segment, the third core segment, and the fourth core segment.

8. The magnetic jammer according to claim 3, wherein, the core comprises a plurality of separable core segments integrated into a single unit.

9. The magnetic jammer according to claim 8, wherein, the core segments comprise:
    a first core segment having a linear rod shape;
    a second core segment having a linear rod shape and disposed parallel to the first core segment;
    a third core segment having a linear rod shape and disposed parallel to the first core segment;
    a fourth core segment having a linear shape and disposed parallel to the first core segment; and
    a connecting core segment having a linear rod shape and being fixed to an end portion of the first core segment, an end portion of the second core segment, an end portion of the third core segment, and an end portion of the fourth core segment, and
    the coil is wound around the first core segment, the second core segment, the third core segment, and the fourth core segment.

10. The magnetic jammer according to claim 2, further comprising:
    a circuit board electrically connected to the coil, at least a portion of the circuit board being disposed inside the case,
    wherein the circuit board covers the core and the coil from at least three directions.

11. The magnetic jammer according to claim 10, wherein the circuit board comprises a rigid-flexible substrate comprising two rigid substrates between which the core and the coils are disposed and a flexible printed substrate connecting the two rigid substrates, and the circuit board covers the core and the coil from the three directions.

12. The magnetic jammer according to claim 10, wherein the core comprises a plurality of separable core segments integrated into a single unit.

13. The magnetic jammer according to claim 10, wherein, the core segments comprise:
    a first core segment having a linear rod shape;
    a second core segment having a linear rod shape and disposed parallel to the first core segment;
    a third core segment having a linear rod shape and disposed parallel to the first core segment;
    a fourth core segment having a linear rod shape and disposed parallel to the first core segment; and
    a connecting core segment having a linear rod shape and being fixed to an end portion of the first core segment, an end portion of the second core segment, an end portion of the third core segment, and an end portion of the fourth core segment, and
    the coil is wound around the first core segment, the second core segment, the third core segment, and the fourth core segment.

14. The magnetic jammer according to claim 2, wherein, the core comprises a plurality of separable core segments that comprise separate bodies integrated into a single unit.

15. The magnetic jammer according to claim 14, wherein, the core segments comprise:

a first core segment having a linear rod shape;

a second core segment having a linear rod shape and disposed parallel to the first core segment;

a third core segment having a linear rod shape and disposed parallel to the first core segment;

a fourth core segment having a linear rod shape and disposed parallel to the first core segment; and a connecting core segment having a linear rod shape and being fixed to an end portion of the first core segment, an end portion of the second core segment, an end portion of the third core segment, and an end portion of the fourth core segment, and the coil is wound around the first core segment, the second core segment, the third core segment, and the fourth core segment.

16. The magnetic jammer according to claim 1, further comprising:

a circuit board electrically connected to the coil, at least a portion of the circuit board being disposed inside the case, wherein the circuit board covers the core and the coil from at least three directions.

17. The magnetic jammer according to claim 16, wherein the circuit board comprises a rigid-flexible substrate comprising two rigid substrates between which the core and the coils are disposed and a flexible printed substrate connecting the two rigid substrates, and the circuit board covers the core and the coil from the three directions.

18. The magnetic jammer according to claim 16, wherein, the core comprises a plurality of separable core segments integrated into a single unit.

19. The magnetic jammer according to claim 18, wherein, the core segments comprise:

a first core segment having a linear rod shape;

a second core segment having a linear rod shape and disposed parallel to the first core segment;

a third core segment having a linear rod shape and disposed parallel to the first core segment;

a fourth core segment having a linear rod shape and disposed parallel to the first core segment; and a connecting core segment having a linear rod shape and being fixed to an end portion of the first core segment, an end portion of the second core segment, an end portion of the third core segment, and an end portion of the fourth core segment, and the coil is wound around the first core segment, the second core segment, the third core segment, and the fourth core segment.

20. The magnetic jammer according to claim 18, wherein, the core comprises a plurality of separable core segments that comprise separate bodies integrated into a single unit.

21. The magnetic jammer according to claim 20, wherein, the core segments comprise:

a first core segment having a linear rod shape;

a second core segment having a linear rod shape and disposed parallel to the first core segment;

a third core segment having a linear rod shape and disposed parallel to the first core segment;

a fourth core segment having a linear rod shape and disposed parallel to the first core segment; and a connecting core segment having a linear rod shape and being fixed to an end portion of the first core segment, an end portion of the second core segment, an end portion of the third core segment, and an end portion of the fourth core segment, and the coil is wound around the first core segment, the second core segment, the third core segment, and the fourth core segment.

22. A card reader for use with a card, the card reader comprising:

a magnetic jammer structured to generate a magnetic field for jamming illegal reading of magnetic data stored on the card, wherein, the magnetic jammer comprises: a core comprising magnetic material; a coil wound around the core and structured to generate a jamming magnetic field; a case accommodating the core and the coil; and a resin sealant filling the inside of the case and covering the core and the coil, the core and the coil are disposed apart from an inner face of the case such that the core and the coil do not come into contact with the inner face of the case, and a portion of the resin sealant is disposed between the core and the inner face of the case and between the coil and the inner face of the case.

* * * * *